United States Patent
Yoon (10) Patent No.: US 9,692,873 B2
(45) Date of Patent: Jun. 27, 2017

(54) MOBILE TERMINAL AND SCREEN COMPOSITION METHOD FOR CONTROLLING THE DISPLAY OF A SCREEN OUTPUT BASED ON A STATE AND ENVIRONMENT IN WHICH THE MOBILE TERMINAL IS OPERATING

(75) Inventor: Jin Sook Yoon, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 765 days.

(21) Appl. No.: 12/856,978

(22) Filed: Aug. 16, 2010

(65) Prior Publication Data

US 2011/0047510 A1 Feb. 24, 2011

(30) Foreign Application Priority Data

Aug. 21, 2009 (KR) .................. 10-2009-0077457

(51) Int. Cl.
 *G06F 3/048* (2013.01)
 *H04M 1/725* (2006.01)
(52) U.S. Cl.
 CPC ... *H04M 1/72566* (2013.01); *H04M 1/72572* (2013.01); *H04M 2250/10* (2013.01); *H04M 2250/12* (2013.01); *H04M 2250/74* (2013.01)
(58) Field of Classification Search
 USPC .................. 715/735, 810, 858, 857, 864
 See application file for complete search history.

(56) References Cited

U.S. PATENT DOCUMENTS

| | | | |
|---|---|---|---|
| 5,276,728 A * | 1/1994 | Pagliaroli et al. | 455/404.1 |
| 8,000,689 B2 * | 8/2011 | Featherstone et al. | 455/414.1 |
| 8,086,265 B2 * | 12/2011 | White | 455/556.1 |
| 8,280,438 B2 * | 10/2012 | Barbera | 455/557 |
| 8,549,426 B2 * | 10/2013 | Kim | 715/810 |
| 2002/0198005 A1 * | 12/2002 | Hilton et al. | 455/456 |
| 2005/0216867 A1 * | 9/2005 | Marvit et al. | 715/863 |
| 2006/0290807 A1 * | 12/2006 | Kim | H04N 5/4401 348/468 |
| 2008/0090534 A1 * | 4/2008 | Wai | 455/187.1 |
| 2009/0088904 A1 * | 4/2009 | Brioschi | 700/281 |
| 2009/0100384 A1 * | 4/2009 | Louch | 715/863 |

(Continued)

FOREIGN PATENT DOCUMENTS

| | | |
|---|---|---|
| KR | 10-2006-0135342 A1 | 12/2006 |
| KR | 10-0861656 B1 | 9/2008 |

(Continued)

OTHER PUBLICATIONS

"How to Hide or Show System Icons and Notifications in Windows 7" by Brink, Internet WayBack Machine, Dec. 28, 2008. 5 pages.*

(Continued)

*Primary Examiner* — Hien Duong
(74) *Attorney, Agent, or Firm* — Jefferson IP Law, LLP (57) ABSTRACT

A mobile terminal and screen composition method for the same are provided. The screen composition method may compose distinct screens having different icons and arrangements according to various collected information in relation to time, location and others, and output a screen that is adapted to the current situation. Hence, the user may use the mobile terminal in an easy and convenient manner.

6 Claims, 8 Drawing Sheets

(56) References Cited

U.S. PATENT DOCUMENTS

| | | | |
|---|---|---|---|
| 2009/0132197 A1* | 5/2009 | Rubin | H04M 1/72563 |
| | | | 702/141 |
| 2009/0158168 A1 | 6/2009 | Heo et al. | |
| 2009/0201270 A1* | 8/2009 | Pikkujamsa et al. | 345/184 |
| 2009/0259968 A1* | 10/2009 | Hsieh et al. | 715/808 |
| 2009/0295788 A1* | 12/2009 | Duncan | G06F 9/4443 |
| | | | 345/418 |
| 2009/0307616 A1* | 12/2009 | Nielsen | 715/764 |
| 2010/0016014 A1* | 1/2010 | White | 455/556.1 |
| 2010/0146444 A1* | 6/2010 | Wang et al. | 715/815 |
| 2011/0126145 A1* | 5/2011 | Rhee et al. | 715/772 |

FOREIGN PATENT DOCUMENTS

| | | |
|---|---|---|
| KR | 10-2009-0058322 A1 | 6/2009 |
| KR | 10-2009-0076648 A1 | 7/2009 |

OTHER PUBLICATIONS

"How to turn system icons on or off" by Brink, Internet WayBack Machine, Dec. 5, 2008. 3 pages.*

* cited by examiner

MOBILE TERMINAL AND SCREEN
COMPOSITION METHOD FOR
CONTROLLING THE DISPLAY OF A
SCREEN OUTPUT BASED ON A STATE AND
ENVIRONMENT IN WHICH THE MOBILE
TERMINAL IS OPERATING

PRIORITY

This application claims the benefit under 35 U.S.C. §119 (a) of a Korean patent application filed on Aug. 21, 2009 in the Korean Intellectual Property Office and assigned Serial No. 10-2009-0077457, the entire disclosure of which is hereby incorporated by reference.

BACKGROUND OF THE INVENTION

1. Field of the Invention

The present invention relates to a mobile terminal. More particularly, the present invention relates to a mobile terminal and screen composition method for the same wherein the current situation of the mobile terminal is identified based on information regarding various conditions such as the location of the mobile terminal and time, and a screen matching the identified current situation is output.

2. Description of the Related Art

A mobile terminal is a terminal that supports various user functions based on mobility. Recently, mobile terminals have entered into widespread use due to their convenience and portability. A mobile terminal is generally equipped with specific functional modules supporting various user functions. For example, the mobile terminal may include a file search module for playing back stored image files, an MP3 player module for playing back music files, and a camera module for capturing images. These modules supporting corresponding user functions are activated according to explicit control of the user.

A mobile terminal having various functions may be a dumb electronic device without explicit control of the user. A mode of operation is desired that enables the user to use a desired one of various services provided by the mobile terminal in a convenient and intelligent manner.

SUMMARY OF THE INVENTION

An aspect of the present invention is to address the above-mentioned problems and/or disadvantages and to provide at least the advantages described below. Accordingly, an aspect of the present invention is to provide a mobile terminal and screen composition method for the same that compose the display screen according to the current situation to promote fast and timely utilization of user functions.

In accordance with an aspect of the present invention, a screen composition method for a mobile terminal is provided. The method includes collecting information related to at least one of a location of the mobile terminal, short-range communication, broadcast reception, sensing operation, camera operation, and call handling, comparing the collected information with a preset screen setting value, when the collected information matches the screen setting value, identifying screen information corresponding to the screen setting value, and outputting a screen composed based on the identified screen information.

In accordance with another aspect of the present invention, a mobile terminal is provided. The terminal includes a control unit for collecting information generated by activation of user functions, for comparing the collected information with a preset screen setting value, and for composing, when the collected information matches the screen setting value, a screen based on screen information corresponding to the screen setting value, and a display unit for outputting the composed screen, wherein the control unit collects at least one of location information, short-range communication information, broadcast reception information, speech recognition information of an audio signal, sensing information related to operation of a sensor module, camera information, and call handling information.

In accordance with another aspect of the present invention, a mobile terminal is provided. The mobile terminal includes a display unit; and a controller for collecting information, for comparing the collected information with at least one user-defined screen setting values, and when the collected information corresponds to one of the user-defined screen setting values, for controlling the display unit to display a screen based on the corresponding user-defined screen setting value, wherein the collected information includes information on a state of the mobile terminal and information on an environment in which the mobile terminal is operating.

According to an aspect of the present invention, the mobile terminal and screen composition method for the same employ a display screen that enables the user to execute a desired user function in a fast and timely manner.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness . . . .

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The mobile terminal according to exemplary embodiments of the present invention may compare at least one item of information collected from components thereof with a preset screen setting value, and, when the information item has a value equal to or similar to the screen setting value, output a preset screen on the display unit. Accordingly, the user may view a screen adapted to a particular situation, and invoke an appropriate function without explicitly searching for the function.

The screen setting value may be a value of an item of information collectable by individual components of the mobile terminal. For example, the screen setting value may correspond to specific coordinates in location information collected by a Global Positioning System (GPS) module. The screen setting value may correspond to a specific date and time in time information given by a Real Time Clock (RTC). The screen setting value may correspond to a specific sensing value in various sensing information obtained by a sensor module, and may be an indicator indicating activation of a short-range communication module or a broadcast reception module.

Figure 1:
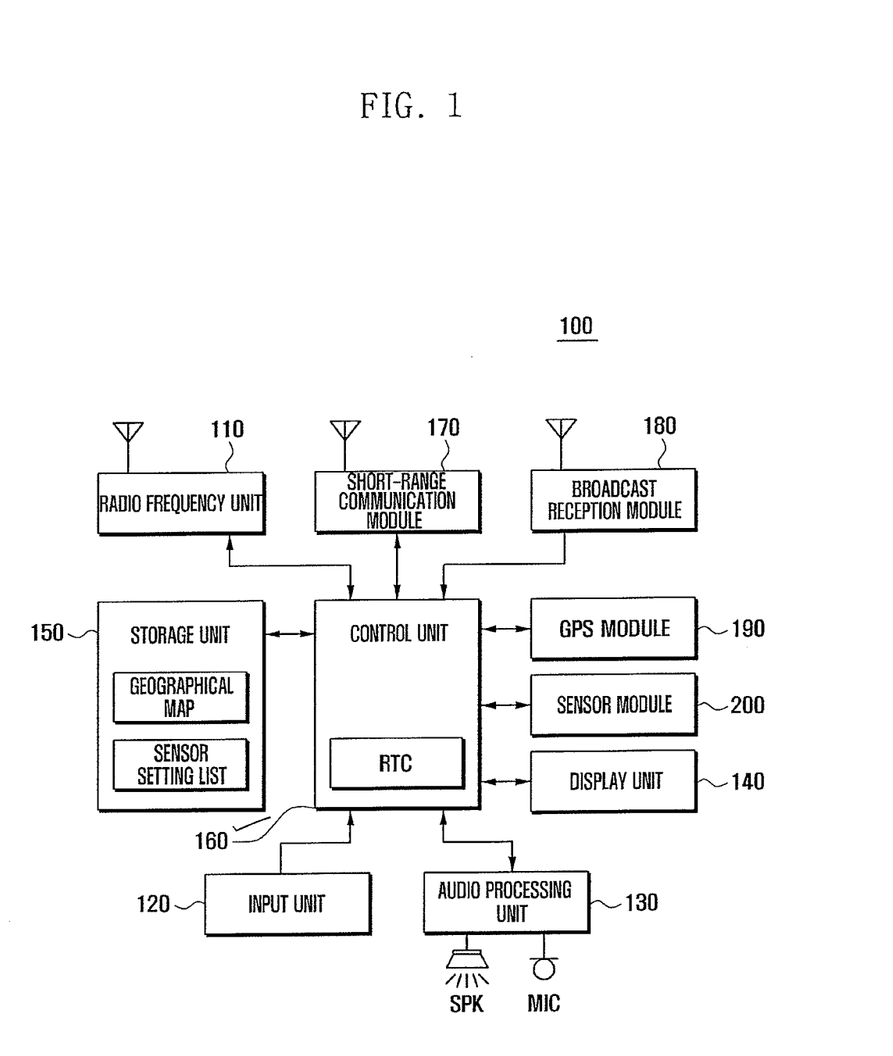
FIG. 1 is a block diagram of a mobile terminal according to an exemplary embodiment of the present invention.

FIG. 1 is a block diagram of a mobile terminal according to an exemplary embodiment of the present invention.

Referring to FIG. 1, the mobile terminal 100 may include a radio frequency unit 110, an input unit 120, an audio processing unit 130, a display unit 140, a storage unit 150, a short-range communication module 170, a broadcast reception module 180, a GPS module 190, a sensor module 200, and a control unit 160. The mobile terminal 100 may include additional and/or different units. Similarly, the functionality of two or more of the above units may be integrated into a single component.

The mobile terminal 100 as shown in FIG. 1 collects information via the internal components, and may recompose the display screen by checking whether the collected information corresponds to a pre-stored screen setting value. For example, after outputting a screen such as an idle screen, the mobile terminal 100 may output a screen including widget icons and menu icons according to correspondence between the collected information and screen setting value. Accordingly, the user may use the screen including widget icons and menu icons in a particular situation.

The radio frequency unit 110 may establish a communication channel to a base station for data and voice communication with another mobile terminal. To achieve this, the radio frequency unit 110 may include a radio frequency transmitter for upconverting the frequency of a signal to be transmitted and amplifying the signal, and a radio frequency receiver for low-noise amplifying a received signal and downconverting the frequency of the received signal. The radio frequency unit 110 establishes a communication channel for functions related to voice calls, messaging, instant messaging, video calls, and data transmission. A menu icon associated with a call handling function of the radio frequency unit 110, and a widget icon associated with a server access function, may be displayed on the display unit 140. The user may directly invoke the call handling function or server access function using the menu icon or widget icon. Such a menu icon or widget icon associated with a function of the radio frequency unit 110 may be added to or removed from a particular screen according to correspondence between collected information and the screen setting value.

The input unit 120 may include a plurality of alphanumeric and function keys for inputting alphanumeric information and for setting various functions. The function keys may include direction, side, and shortcut keys associated with specific functions. The input unit 120 may send a key signal input for controlling the operation of the mobile terminal 100 to the control unit 160. The input unit 120 may generate, according to user actions, input signals for activating various functions related to, for example, call handling, playback of moving images or music files, image file search, broadcast reception, camera operation, audio recording, short-range communication, location identification, sensing, and speech recognition, and send the input signals to the control unit 160. The input unit 120 may generate an input signal for selecting at least one of various icons including a menu icon and widget icon on the screen, and send the input signal to the control unit 160. To support these operations, the mobile terminal 100 may further include a camera module, a speech recognition module, and a speech recognition database.

The audio processing unit 130 may, under the control of the control unit 160, reproduce an audio signal received by the radio frequency unit 110 through a speaker SPK, and transmit an audio signal such as a voice signal received by a microphone MIC through the radio frequency unit 110. When at least one icon on the screen is selected, the audio processing unit 130 may output a corresponding audio signal. When a screen is output in response to collection of information having a value equal to or similar to the screen setting value, the audio processing unit 130 may output a preset audio signal for screen update. The audio processing unit 130 may send a voice signal collected by the microphone MIC to the control unit 160, which may then recognize the voice carried by the voice signal, and when the recognition result corresponds to the screen setting value control the screen update based on the recognition result. To achieve this, the storage unit 150 may store a voice recognition module and a voice recognition database. The voice recognition module may be loaded in the control unit 160, and the control unit 160 may refer to the voice recognition database for voice recognition.

The display unit 140 may display various menus, data input by the user, screen setting information, and information to be provided to the user. The display unit 140 may be realized using Liquid Crystal Display (LCD) devices or Organic Light Emitting Diodes (OLED). When the display unit 140 has a touch screen capability, the display unit 140 may act as an input device. The display unit 140 may output various editing screens for defining and changing the screen setting value, and output a screen setting list pre-stored in the storage unit 150. The screen setting list includes factors defining specific screens, and may include multiple screen information items. Each screen information item specifies, for a particular screen, the types and number of menu icons, and the types and number of widget icons. Accordingly, the display unit 140 may compose a screen associated with a specific screen setting value on the basis of the screen setting list under the control of the control unit 160. Screen interfaces are described later with reference to FIGS. 3-7.

The storage unit 150 may store programs related to the operation of the mobile terminal 100, and user data. The storage unit 150 may include a program area and a data area.

The program area may store an Operating System (OS) for controlling the overall operation of the mobile terminal 100, and program modules for various functions related to call handling, playback of moving images or music files, image file search, broadcast reception, camera operation, audio recording, short-range communication, location identification, sensing, and speech recognition. Each program module is loaded on the control unit 160 in response to an input signal requesting activation of the related function, performs an initialization procedure for the function, and executes the function according to a pre-scheduled event or a user input signal. The program area may store an application program supporting a screen update function. The application program for the screen update function examines collected information with reference to the screen setting value, and, when a condition is satisfied (i.e., when the collected information has a value similar to the screen setting value), composes a specific screen based on a screen information item matching the screen setting value.

The data area is an area that stores data generated in the course of using the mobile terminal 100, and may store phonebook information, audio data, content data, and other user data. The data area may store geographical map data, a screen setting list, a screen setting value, and a voice recognition database. The screen setting value is a value in information collectable by various components, and may match a screen information item. For example, the screen setting value may be a location information value collected by the GPS module 190, a time value, or a sensing value obtained by the sensor module 200. The screen setting value may also be a value obtainable through various functions related to, for example, short-range communication, broadcast reception, voice recognition, and camera operation.

The screen information item describes elements of a particular screen, and includes at least one of information regarding types and positions of menu icons, information regarding types and positions of widget icons, information regarding types and positions of soft keys, and information regarding types and arrangements of background images. The map data is provided to support the function of the GPS module 190. When the GPS module 190 is activated to collect current location information, the mobile terminal 100 may mark the current location on the map. The screen setting list may provide a screen information item describing a screen that is to be composed when collected information corresponds to the screen setting value.

The data area may temporarily store information collected by each component, and may provide the screen setting value for checking correspondence between the collected information and the screen setting value. The collected information may include a call history in relation to call handling, a file playback history in relation to playback of moving images or music files, a file search history and a list of found files in relation to image file search, a viewing history in relation to broadcast reception, a list of captured images in relation to camera operation, a recording history in relation to audio recording, a communication history in relation to short-range communication, sensing results, and speech recognition results.

The short-range communication module 170 enables short-range communication in the mobile terminal 100, and may search for nearby short-range communication devices in response to an input signal from the input unit 120 and display a list of communicable short-range communication devices on the display unit 140. When a request for short-range communication is made, the short-range communication module 170 may send information on short-range communication to the control unit 160, which may then check the correspondence between the information on short-range communication and the screen setting value to trigger a screen change. The screen setting value may indicate initiation of short-range communication.

The broadcast reception module 180 supports broadcast reception. When the broadcast reception module 180 is activated in response to an input signal from the input unit 120, the broadcast reception module 180 receives a broadcast signal based on stored broadcast information, decodes the received broadcast signal, and outputs the decoded broadcast signal to the display unit 140 and audio processing unit 130. When the user makes a request for broadcast reception, the broadcast reception module 180 sends information on broadcast reception to the control unit 160, which may then check the correspondence between the information on broadcast reception and the screen setting value to trigger a transition from the current screen to the next screen. The current screen and the next screen may be an idle screen or the like. The screen setting value may be related to activation of the broadcast reception module 180 and antenna tuning. When broadcast reception is ended, the mobile terminal 100 may output a screen composed based on the screen information item matching the screen setting value.

The GPS module 190 is configured to provide location information of the mobile terminal 100. According to an input signal from the input unit 120 or preset scheduling information, the GPS module 190 locates the current position of the mobile terminal 100 using satellite signals and sends the located position information to the control unit 160. The control unit 160 may then control the display unit to mark the current position on the map or check the correspondence between the located position information and the screen setting value to trigger a screen transition. The screen setting value may be a specific location specified by the user.

The sensor module 200 may include a temperature sensor, a humidity sensor, a gravity sensor, or an acceleration sensor. The sensor module 200 may be turned on to collect sensing information according to a period set by the user, a preset schedule, or an input signal from the input unit 120. The collected sensing information is sent to the control unit 160. The control unit 160 may check whether the collected sensing information has a value equal to or similar to the screen setting value. When the collected sensing information has a value equal to or similar to the screen setting value, the control unit 160 may cause a transition from the current screen to a screen indicated by the screen setting value. The screen setting value may be a specific value in sensing information, such as a temperature, humidity, gravity, orientation, or motion value.

The control unit 160 may control the overall operation of the mobile terminal 100, control signal exchange between the internal blocks, and control data processing. The control unit 160 examines information collected by each component of the mobile terminal 100 by checking whether the collected information has a value equal to or similar to the pre-stored screen setting value. When the collected information has a value equal to or similar to the screen setting value, the control unit 160 controls an operation to compose a screen based on a screen information item matching the screen setting value.

Figure 2:
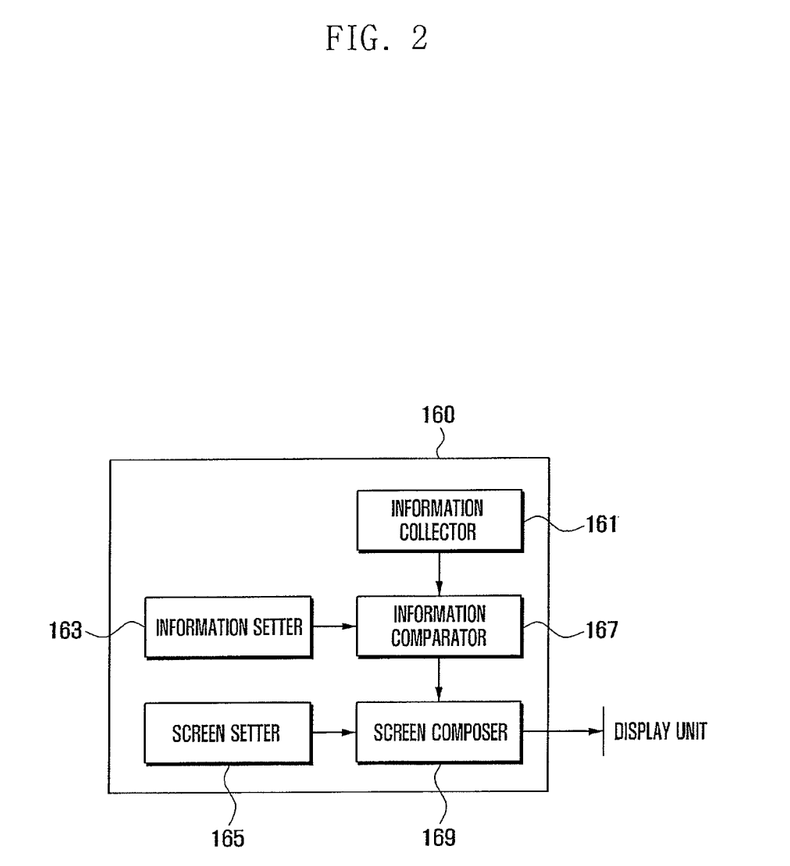
FIG. 2 is a block diagram of a control unit of a mobile terminal according to an exemplary embodiment of the present invention.

FIG. 2 is a block diagram of a control unit according to an exemplary embodiment of the present invention.

Referring to FIG. 2, the control unit 160 includes an information collector 161, an information setter 163, an information comparator 167, a screen setter 165, and a screen composer 169. The control unit 160 may further include a RTC that keeps track of the current time.

The information collector 161 may collect information regarding the activation time of each component such as the radio frequency unit 110, the microphone of the audio processing unit 130, the short-range communication module 170, the broadcast reception module 180, the GPS module 190, or the sensor module 200. The information collector 161 may collect information generated by functions activated according to an input signal from the input unit 120. For example, when at least one of the short-range communication module 170, broadcast reception module 180, GPS module 190, and sensor module 200 is activated according to an input signal from the input unit 120, the information collector 161 may collect information generated by the activated component (i.e., short-range communication information, broadcast reception information, current location information, and/or sensing information). The information collector 161 may also collect information related to voice recognition, image capture, or calls from the corresponding activated function. The information collector 161 sends the collected information to the information comparator 167.

The information setter 163 is used to define the screen setting value. The information setter 163 enables the user to set a screen setting value and to change the screen setting value. To achieve this, the information setter 163 may provide an editing screen for setting and changing the screen setting value. One editing screen or multiple editing screens may be allocated for various screen setting values. For example, editing screens may be allocated respectively for screen setting values in time information, location information and sensing information. The editing screen for setting a screen setting value is described later with reference to FIGS. 3-7.

The information comparator 167 receives, upon reception of collected information from the information collector 161, a corresponding screen setting value from the information setter 163, and compares the collected information with the screen setting value. The information comparator 167 calculates the level of similarity (or sameness) between the collected information with the screen setting value. When the level of similarity is greater than a threshold value, the information comparator 167 informs the screen composer 169 of the screen setting value. For example, when the screen setting value includes location data and time data, the information comparator 167 checks whether the current location data obtained by the GPS module 190 is equal to the location data of the screen setting value within a given tolerance and the current time data obtained by the RTC is equal to the time data of the screen setting value within a given tolerance. When the current location data is equal to the location data of the screen setting value and the current time data is equal to the time data of the screen setting value, the information comparator 167 sends the screen setting value to the screen composer 169.

The screen setter 165 provides screen information corresponding to a specific screen setting value, and provides an editing screen enabling the user to define the screen information. When the screen composer 169 receives a screen setting value from the information comparator 167, the screen setter 165 locates information on a screen to be composed by the screen composer 169 and provides the located screen information to the screen composer 169. When collected information matching a screen setting value requires a screen transition, the screen setter 165 provides an editing screen enabling the user to specify screen information for a screen to be output. Accordingly, the user may use the screen setter 165 to create screen information corresponding to a specific screen setting value by specifying menu icons and widget icons to be contained in the screen. To achieve this, the mobile terminal 100 may provide menu items for screen setting. Upon activation of such a menu item, a linked editing screen is provided to enable the user to arrange various screen elements (for example, background images, menu icons, widget icons and soft keys) in a new screen through the input unit 120.

The screen composer 169 retrieves, upon reception of a screen setting value from the information comparator 167, screen information corresponding to the screen setting value from the screen setter 165, and composes a screen to be output to the display unit 140 on the basis of the screen information. The screen composer 169 may identify the type and position of each menu icon or widget icon specified in the screen information, and control an operation to output each icon at the identified position.

As described above, the mobile terminal 100 may perform a screen transition from the current screen to a preset screen corresponding to information collectable through various components, such as location information, time information, sensing information, communication information and other log information. This permits the user to use a screen adapted to a particular situation. The screen interface using the display unit 140 is described below with reference to FIGS. 3-7.

Figure 3:
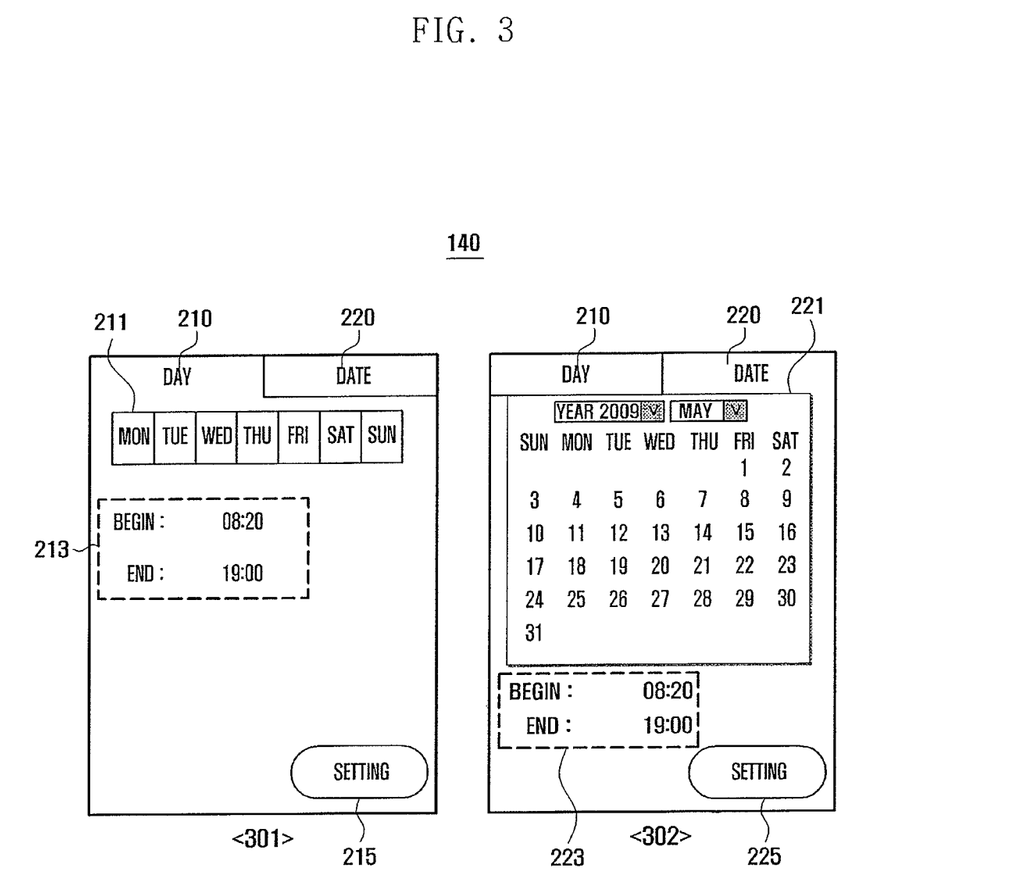
FIG. 3 illustrates screen representations for setting and editing time information according to an exemplary embodiment of the present invention.

FIG. 3 illustrates representations of an editing screen provided by an information setter for setting time information according to an exemplary embodiment of the present invention.

Referring to FIG. 3, the display unit 140 may display a first tag 210 for selecting the day of the week and a second tag 220 for selecting the date, and, when the first tag 210 is selected, output an editing screen for day selection as shown by a screen 301. The screen 301 includes the first tag 210 named "day", a day field 211 for displaying selectable days of the week, and a time setting field 213 for specifying a time range during which a preset screen is to be output on the selected day. The screen 301 may further include a soft key 215 labeled "setting" for setting information according to the selections made to the day field 211 and time setting field 213.

When the second tag 220 for selecting the date is selected by the user, the display unit 140 outputs an editing screen for date selection as shown by a screen 302. The screen 302 includes the second tag 220 named "date", a date field 221 for selecting a date in a calendar month, and a time setting field 223 for specifying a time range during which a preset screen is to be output on the selected date. The screen 302 may further include a soft key 225 labeled "setting" for setting information according to the selections made to the date field 221 and time setting field 223.

After day and date setting, the display unit 140 may output an editing screen for specifying information on a screen that is to be output on the set day and date. Using the editing screen, the user may select menu icons associated with user functions and widget icons associated with widget functions as screen information. The user may specify screen information for a screen to be output in a desired situation, and the mobile terminal 100 may compose the screen according to the specified screen information and output the composed screen upon encountering the situation. In the editing screen, a menu for specifying a background image, a menu icon indicating a user function, a widget icon indicating a widget function, and a soft key may be provided in the form of a tray. When the mobile terminal 100 has a touch screen capability, the user may specify screen information by touching the icons in the tray.

Figure 4:
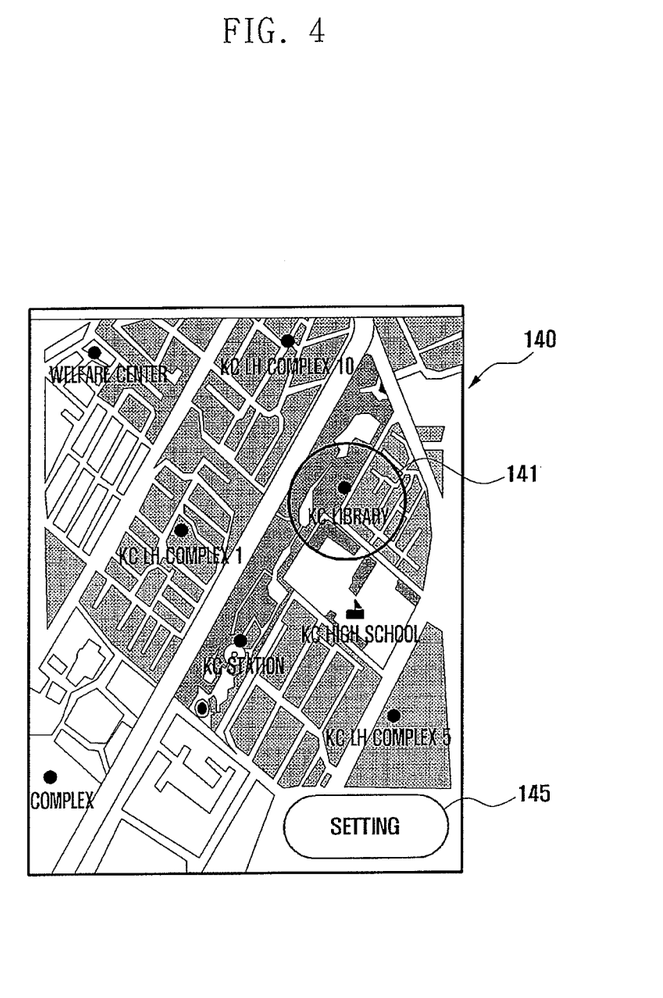
FIG. 4 illustrates a screen representation for setting and editing location information according to an exemplary embodiment of the present invention.

FIG. 4 illustrates an editing screen provided by an information setter for setting location information according to an exemplary embodiment of the present invention.

Referring to FIG. 4, the display unit 140 may output a geographical map using map data stored in the storage unit 150. The scale of the map may be altered according to user manipulation, and types of displayed information may vary according to map scale. For example, when the user selects a large scale, the display unit 140 may output the map in the form of a town plan. When the map of a desired geographical region is displayed on the display unit 140, the user may select a particular location. For example, when the display unit 140 has a touch screen capability, the user may touch a specific point 141 on the map. When the display unit 140 does not have a touch screen capability, the user may use a direction key to select the point 141 on the map.

After selecting the point 141 on the map, the user may enter a "setting" key to use the selected point 141 as location information at a later time. Instead of selecting a point on the map, the user may specify a range around a point on the map as shown. For example, the user may specify a range with a circle around the point 141 ("library"). When the display unit 140 has a touch screen capability, the user may specify a range by touching and dragging. In addition, the user may specify a path by selecting two or more points on the map, and the mobile terminal 100 may use the path connecting the selected points as location information. The path may be a shortest path connecting the selected points or be a path drawn by the user. After location selection, the mobile terminal 100 may output an editing screen for specifying or changing information on a screen that is to be output when the mobile terminal 100 is at the selected location.

Figure 5:
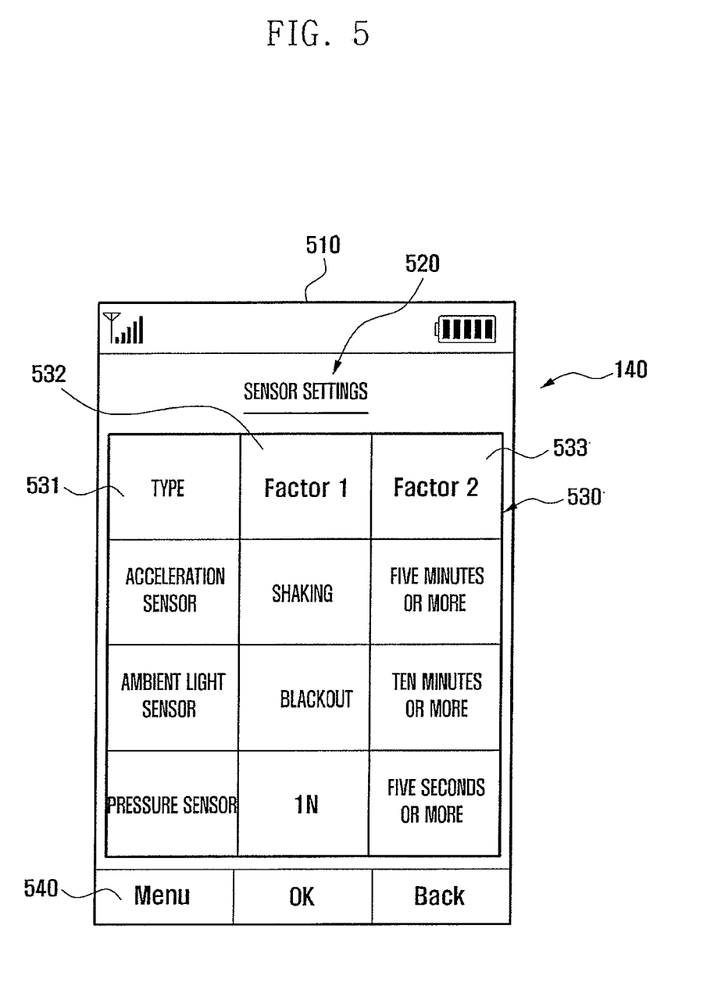
FIG. 5 illustrates a screen representation for setting and editing sensor information according to an exemplary embodiment of the present invention.

FIG. 5 illustrates an editing screen provided by an information setter for setting sensor information according to an exemplary embodiment of the present invention.

Referring to FIG. 5, the display unit 140 may output an editing screen for setting sensor information. The user may activate a menu or short cut key related to sensor information setting, and the mobile terminal 100 may output an editing screen for setting sensor information as shown. The editing screen on the display unit 140 may include an indicator zone 510, a title zone 520, an editing zone 530, and a soft key zone 540. The indicator zone 510 may be used to display an icon indicting the signal level of a received signal and an icon indicating the remaining battery power, and may be removed from the display unit 140 according to user settings. The title zone 520 indicates the title of information (for example, "sensor settings") served on the current screen. The title may be determined and changed by the user. The soft key zone 540 may be used to display soft keys for menu selection, confirmation, and returning to the previous screen.

The editing zone 530 may include a type field 531 indicating the sensor type, and a factor-1 field 532 and a factor-2 field 533 specifying sensing values. The type field 531 is used to indicate the type of a sensor that may cause a screen transition according to a screen setting value. For example, when an acceleration sensor, an ambient light sensor, a pressure sensor, a temperature sensor and a direction sensor are selected so as to cause a screen transition, the type field 531 may store a type description "acceleration sensor", "ambient light sensor", "pressure sensor", "temperature sensor" or "direction sensor".

The factor-1 field 532 is used to describe or select an attribute related to a sensor given by the type field 531. Rather than forcing the user to describe a specific phenomenon in the factor-1 field 532, the user may select a desired one from a provided list of phenomena detectable by the sensor. For example, in the case of an acceleration sensor, a rollup window may be provided in the factor-1 field 532 to permit selection of one of "shaking", "snap", "left direction", and "right direction". Alternatively, a direction key may be used for making such a selection. The factor-1 field 532 may describe a phenomenon detectable by the corresponding sensor. For example, the factor-1 field 532 shows "blackout" for the ambient light sensor, and shows "1N" for the pressure sensor. The user may specify a specific phenomenon for the factor-1 field 532.

The factor-2 field 533 is used to further describe the phenomenon in the factor-1 field 532. For example, in the case of the acceleration sensor, the factor-2 field 533 may be set to "longer than or equal to five minutes" for "shaking" in the factor-1 field 532. Similarly to the case of the factor-1 field 532, the user may select a desired phenomenon from a provided list of descriptions applicable to the factor-2 field 533. For example, in the case of the acceleration sensor, the factor-2 field 533 may provide a rollup window containing a list of selectable descriptions including "longer than or equal to one minute", "longer than or equal to two minutes", "longer than or equal to four minutes", and "longer than or equal to five minutes", and the user may select one of the descriptions as a value in the factor-2 field 533. In the case of the ambient light sensor, the factor-2 field 533 may be set to "longer than or equal to ten minutes". In the case of the pressure sensor, the factor-2 field 533 may be set to "longer than or equal to fifteen minutes".

In the above description, multiple sensors are used to trigger a screen transition. However, exemplary embodiments of the present invention are not limited thereto. The user may select one of multiple sensors and use only the selected sensor for screen manipulation. For example, the user may use only the acceleration sensor or the ambient light sensor for screen manipulation. Those sensors that are not selected for screen manipulation need not be used for triggering a screen transition. In the description, a sensor is characterized by two factors. However, for each sensor, more than two factors may be used to specify a sensing value for screen manipulation.

After sensor information setting, the mobile terminal 100 may output an editing screen for specifying or changing information on a screen that is to be output when the corresponding sensor detects a specified phenomenon. The user may create screen information through the editing screen, and store the created screen information. The mobile terminal 100 composes a screen according to the screen information, and may output the screen when the specified sensor detects a preset sensing value.

Figure 6:
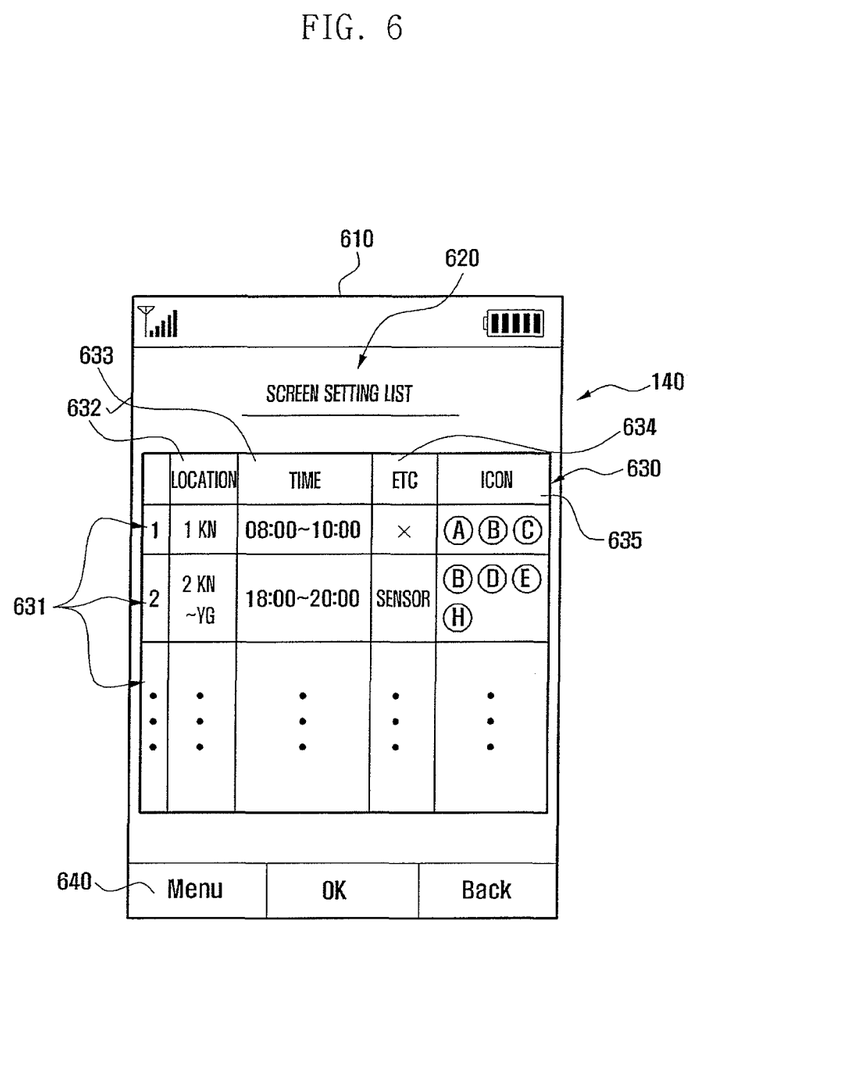
FIG. 6 illustrates a screen representation for checking and editing a screen setting list containing screen setting values and screen information according to an exemplary embodiment of the present invention.

FIG. 6 illustrates an editing screen provided by a screen setter for setting screen information according to an exemplary embodiment of the present invention.

Referring to FIG. 6, the display unit 140 may output an editing screen for setting screen information corresponding to a specific screen setting value. When the user activates a menu or short cut key associated with the editing screen for setting screen information, the mobile terminal 100 outputs the editing screen for setting screen information as shown. The editing screen output by the display unit 140 may include an indicator zone 610, a title zone 620, a list zone 630, and a soft key zone 640. The indicator zone 610 may be used to display an icon indicting a basic operation (such as an icon indicting the signal level of a received signal, or an icon indicating remaining battery power), and may be removed from the display unit 140 during screen information editing according to user settings. The title zone 620 indicates the title of information (for example, "screen setting list") served on the current screen. The title may be determined and changed by the user. The soft key zone 640 may be used to display soft keys for menu selection, confirmation, and returning to the previous screen.

The list zone 630 may include an index field 631 for storing the index of a list entry, a location field 632, a time field 633, an etc. field 634 and an icon field 635. The location field 632, the time field 633 and the etc. field 634 are used to specify a screen setting value. The index field 631 indicates the index of the corresponding entry in the screen setting list. The indexes of entries may be represented in Arabic numerals or English letters according to a screen composition scheme.

The location field 632 is used to specify a screen setting value in relation to a location. For example, for the first entry, when the user selects a location "KN" on the displayed map, the location "KN" may be stored as a screen setting value in the location field 632. For storage, the location "KN" may be represented by a group of coordinates. For the second entry, a path from "KN" to "YG" may be stored as a screen setting value in the location field 632 according to a user selection. The user may select a location "KN" and a location "YG" on the map, or select a path connecting "KN" and "YG" on the map. For storage, the path from "KN" to "YG" may be represented by a group of coordinates.

The time field 633 is used to specify, as a screen setting value, the time during which a screen containing icons given in the icon field 635 may be output. For example, the first entry has, as a screen setting value, "08:00~10:00" in the time field 633. The second entry has, as a screen setting value, "18:00~20:00" in the time field 633. The user may set time information through the editing screen for setting time information as described in connection with FIG. 3. A blank time field 633 may be recognized as 24 hours by the mobile terminal 100.

The etc. field 634 is used to specify, as a screen setting value, some other kind of information that is not related to location or time. For example, "X" in the etc. field 634 of the first entry indicates absence of a screen setting value in relation to other kinds of information, and "sensor" in the etc. field 634 of the second entry indicates presence of a screen setting value in relation to sensor information. When an input signal for checking the etc. field 634 is generated, the screen setting value related to the information in the etc. field 634 may be output. For example, for the second entry, selecting the etc. field 634 set to "sensor" may result in output of sensor setting information as shown in FIG. 5. In addition to sensor information, the etc. field 634 may contain information related to short-range communication, broadcast reception, camera operation, and audio processing.

The icon field 635 specifies icons to be contained in a screen that is to be output when collected information has a value equal to or similar to the value given in the location field 632, the time field 633 and the etc. field 634. For example, when the mobile terminal 100 is located at "KN" during 08:00-10:00, the mobile terminal 100 may compose a screen containing icons A, B, and C given in the icon field 635 of the first entry. When the mobile terminal 100 is placed at a location between "KN" and "YG" during 18:00-20:00 and the sensor value in the etc. field 634 is satisfied, it may compose a screen containing icons B, D, E, and H given in the icon field 635 of the second entry. This is described further in connection with FIG. 7.

In the above description, a screen containing icons given in the icon field 635 is composed when collected information corresponds to the values given in the location field 632, the time field 633 and the etc. field 634. However, exemplary embodiments of the present invention are not limited thereto. The mobile terminal 100 may compose and output a screen containing icons given in the icon field 635 when collected information corresponds to the value given in the location field 632, to the values given in the location field 632 and time field 633, to the values given in the time field 633 and etc. field 634, or to the values given in the location field 632 and etc. field 634.

Figure 7:
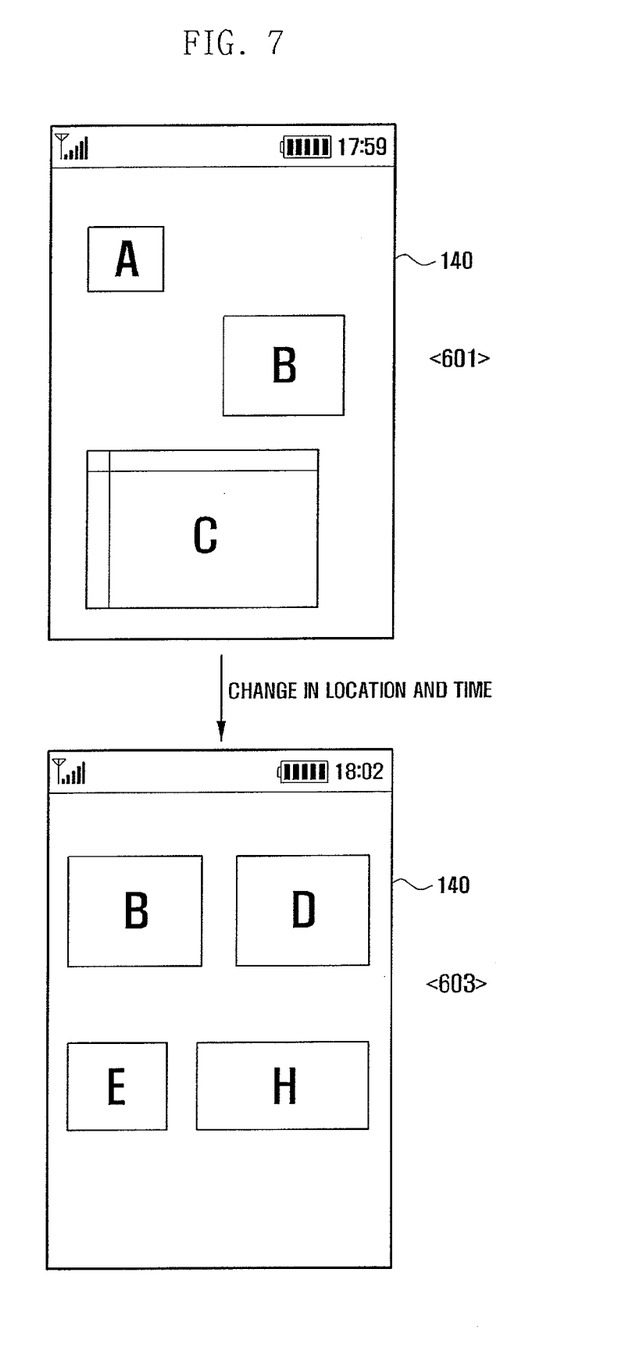
FIG. 7 illustrates a screen representation depicting a screen update function according to an exemplary embodiment of the present invention.

FIG. 7 illustrates a screen representation depicting a screen update function according to an exemplary embodiment of the present invention.

Referring to FIG. 7, the display unit 140 displays a screen 601 containing three icons A, B, and C. The screen 601 has icon A at upper left, icon B at right middle, and icon C at lower left. At least one of the icons A, B, and C may be a menu icon, and at least one of icons A, B, and C may be a widget icon. Icons A, B, and C may be associated with short cut keys for directly activating user functions. The screen 601 having icons A, B, and C may be an idle screen, which is displayed by default when collected information does not correspond to a screen setting value. The mobile terminal 100 may output the screen 601 when there is no event satisfying the screen setting value.

When the mobile terminal 100 is at a specific location with the passage of time, the mobile terminal 100 may compose and output a screen 603 having four icons B, D, E, and H. For example, assume that location information "KN to YG" and time information "18:00-" are set as a screen setting value, and a screen having icons B, D, E and H is composed when the screen setting value is satisfied. When the mobile terminal 100 is placed at a location between "KN" and "YG" after 18:00, the mobile terminal 100 may output the screen 603 having icons B, D, E and H.

When the mobile terminal 100 displaying the screen 601 is placed at a location between "KN" and "YG" before 18:00, the mobile terminal 100 may sustain the screen 601. At some time later, when the mobile terminal 100 is placed at a location between "KN" and "YG" after 18:00, the mobile terminal 100 may make a screen transition from the screen 601 to the screen 603.

As another example, assume, for outputting the screen 603, that sensor information set as a screen setting value specifies a condition that the shaking lasts for five minutes or more. Then, even when the mobile terminal 100 is placed at a location between "KN" and "YG" after 18:00, the mobile terminal 100 may sustain the screen 601. Later, when the acceleration sensor of the sensor module 200 senses a shaking motion lasting for five minutes or more, the mobile terminal 100 may make a screen transition from the screen 601 to the screen 603.

As described above, the mobile terminal 100 may provide the user with a screen adapted to the current situation by making a screen transition based on location information, time information and sensing information. A screen transition is shown as being made based on location information, time information and sensing information. However, exemplary embodiments of the present invention are not limited thereto. The mobile terminal 100 may set a screen setting value using location information, and make a screen transition according to a location change. In addition, the mobile terminal 100 may set a screen setting value using location information and at least one of time information, sensing information, audio path information related to an earphone, broadcast reception information related to an antenna or the broadcast reception module 180, information related to short-range communication, and voice recognition information related to the microphone, and may make a screen transition when collected information corresponds to the screen setting value.

Screens associated with screen setting values may be distinguished by the types and/or number of icons, soft keys, and background images. The screens may also be distinguished by positions of icons and soft keys. The mobile terminal 100 may provide a short-cut key for returning from the current screen associated with a screen setting value to the previous screen (idle screen set by default). The user may then cause a screen transition from the current screen associated with a screen setting value to the idle screen by entering the short-cut key. When the short-cut key is a toggle key, the user may cause a screen transition between a screen associated with a screen setting value and the idle screen by entering the toggle key.

A description of the configuration and screen interface of the mobile terminal 100 that can make a screen transition on the basis of location information or location information and other types of information has been provided above. A screen composition method is described below with respect to FIG. 8.

Figure 8:
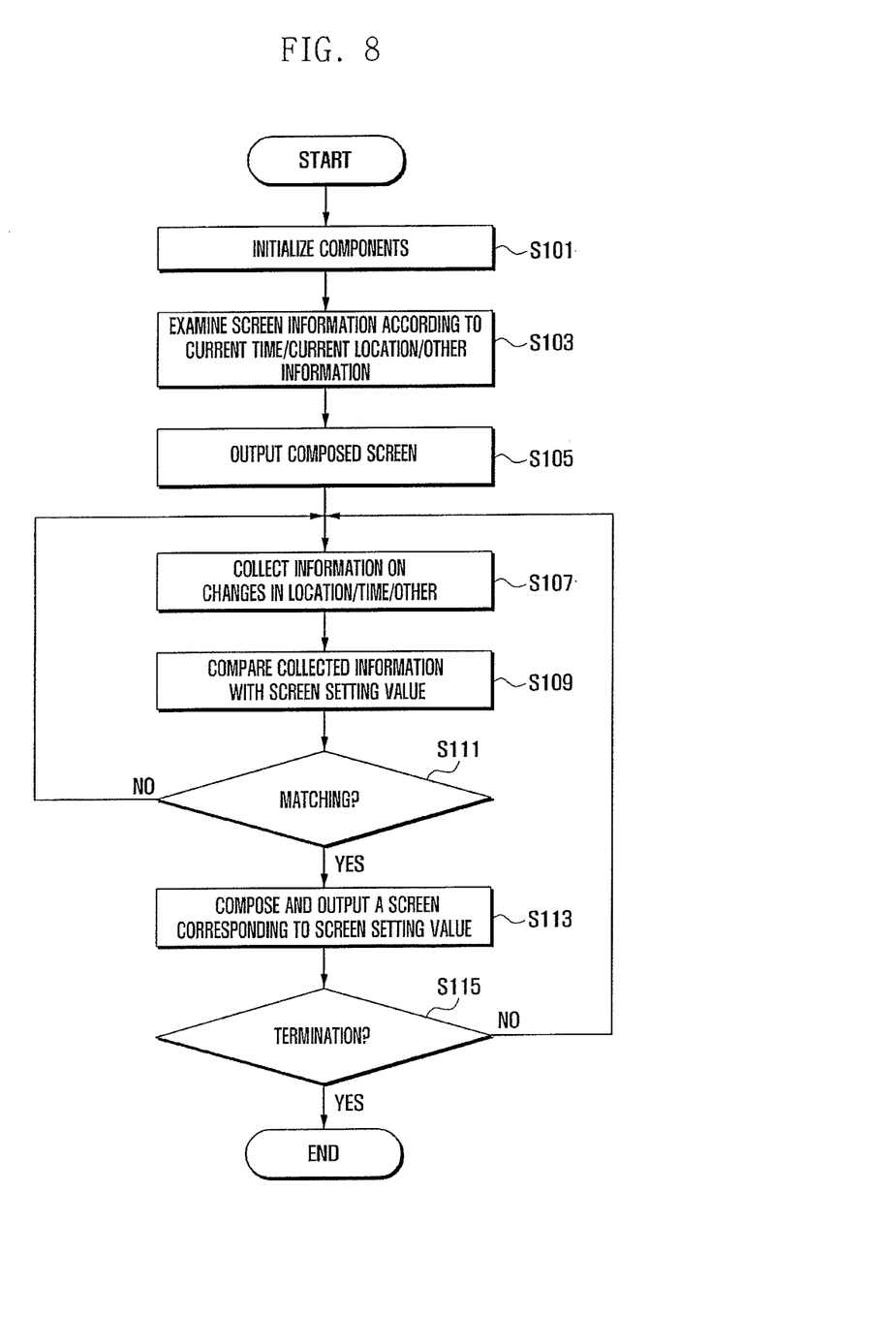
FIG. 8 is a flowchart of a screen composition method according to an exemplary embodiment of the present invention.

FIG. 8 is a flowchart of a screen composition method for a mobile terminal according to an exemplary embodiment of the present invention.

Referring to FIG. 8, in the screen composition method, when the mobile terminal 100 is turned on, the mobile terminal 100 initializes the internal components in step S101. When a preset idle screen is present, the mobile terminal 100 may output the idle screen on the display unit 140.

The mobile terminal 100 examines screen information on the basis of the current time, current location and other information in step S103. The mobile terminal 100 outputs a screen composed using the screen information in step S105. When screen information corresponding to a screen setting value determined by the current time, current location and other information is not present, the mobile terminal 100 may sustain the idle screen.

The mobile terminal 100 collects information on changes in location information, time information, and other information in step S107. The information may include information on a state of the mobile terminal 100, information on an environment of the mobile terminal 100, or information on changes to a state or environment of the mobile terminal 100. For example, when the user moves to another location, the mobile terminal 100 may collect information on a change in location. As time elapses, the mobile terminal 100 may collect information on a change in time. When sensor information is set, the mobile terminal 100 may collect sensing information in relation to the surroundings, motion, state, and the like.

The mobile terminal 100 compares collected information with a screen setting value in step S109, and determine whether the collected information matches a screen setting value in step S111. For example, the mobile terminal 100 may check whether collected location information corresponds to a screen setting value. The mobile terminal 100 may also check whether collected time information corresponds to a screen setting value. A screen setting value may be set based on location information and at least one of time information, sensing information, short-range communication information, call-related information, broadcast reception information, voice recognition information, and audio path change information. To achieve this, the mobile terminal 100 may include at least one of the RTC, sensor module 200, short-range communication module 170, radio frequency unit 110, broadcast reception module 180, voice recognition database, and audio processing unit 130.

When the collected information does not have a value equal to the screen setting value, the mobile terminal 100 returns to step S107 for continued information collection. When the collected information has a value equal to the screen setting value, the mobile terminal 100 composes and outputs a screen corresponding to the screen setting value in step S113. The mobile terminal 100 may pre-store a list or table containing screen information items mapped to screen setting values. The mobile terminal 100 checks whether a termination request is made in step S115. When a termination request is not made, the mobile terminal 100 returns to step S107 for continued processing. "termination" may indicate an ending of an operation of the mobile terminal 100, or may indicate an ending of the screen transition function of the present invention. When a request for terminating the screen transition function is made, the mobile terminal 100 terminates the screen transition function based on the collected information, and may provide a short-cut key for returning to the idle screen. The user may make a screen transition to the idle screen by entering the short-cut key.

In the above description, the screen composition method collects information related to time, location and other conditions, and compares the collected information with a pre-stored screen setting value. However, exemplary embodiments of the present invention are not limited thereto. For example, a screen setting value may be set based on location information, and location information may be collected and compared with the screen setting value. A screen setting value may be set based on location information and time information, and location and time information may be collected and compared with the screen setting value. When the screen transition function is based on location information, the mobile terminal 100 may activate the GPS module 190 at regular intervals to collect current location information. According to exemplary embodiments of the present invention, a screen setting value is set using at least one of location information; time information; short-range communication information; broadcast reception information; voice recognition information related to an audio signal captured by the microphone; sensing information related to motion, state, and situation; and camera information. The collected information is compared with the screen setting value; when the collected information matches the screen setting value, a screen is composed using screen information corresponding to the screen setting value and the composed screen is output.

While the invention has been shown and described with reference to certain exemplary embodiments thereof, it will be understood by those skilled in the art that various changes in form and details may be made therein without departing from the scope and spirit of the invention as defined by the appended claims and their equivalents.

What is claimed is:

1. A method for a mobile terminal, the method comprising:
   receiving location information and audio path information related to an earphone;
   displaying a menu tray associated with a connection of the earphone, the menu tray including at least two icons that are related to an editing menu tray function and at least one of a multimedia function and a phone function, the at least two icons displayed based on the received location information and audio path information related to the earphone;
   when the editing menu tray function is executed, displaying a list of functions displayable on the menu;
   receiving a user input to select one or more functions displayed on the list of functions; and
   displaying the menu tray including the selected one or more functions.

2. A mobile terminal comprising:
   a sensor configured to detect an input from one or more of a plurality of sensors;
   a display;
   at least one processor; and
   at least one memory storing one or more computer programs configured to be executed by the at least one processor, the one or more computer programs including instructions for:
      receiving location information and audio path information related to an earphone,
      generating a menu tray associated with an insertion of the earphone, the menu tray including at least two icons that are related to an editing menu tray function and at least one of a multimedia function and a phone function, the at least two icons displayed based on the received location information and audio path information related to the earphone,
      when the editing menu tray function is executed, displaying a list of functions displayable on the menu,
      storing the menu tray information, displaying the menu tray, and
      in response to receiving a user input to select one or more functions displayed on the list of functions, displaying the menu tray including the selected one or more functions.

3. The mobile terminal of claim 2, wherein the one or more computer programs further include instructions for making a transition from a preset idle screen to the menu tray.

4. The mobile terminal of claim 2, wherein the one or more computer programs further include instructions for:
   generating an input signal causing a backward transition from the menu tray to the previous screen.

5. A method for a mobile terminal, the method comprising:
   displaying an idle screen;
   identifying location information and audio path information related to an earphone;
   displaying a menu tray associated with an insertion of the earphone, the menu tray including at least two icons that are related to an editing menu tray function and at least one of a multimedia function and a phone function, the at least two icons displayed based on the location information and audio path information related to the earphone;
   when the editing menu tray function is executed, displaying a list of functions displayable on the menu;
   receiving a user input to select one or more functions displayed on the list of functions; and
   displaying the menu tray including the selected one or more functions.

6. A mobile terminal comprising:
   a touch sensitive screen;
   at least one processor; and
   at least one memory storing one or more computer programs configured to be executed by the at least one processor, the one or more computer programs including instructions for:
      controlling the touch sensitive screen to display an idle screen, identifying location information and audio path information related to an earphone,
      controlling the touch sensitive screen to display a menu tray associated with an insertion of the earphone, the menu tray including at least two icons that are related to an editing menu tray function and at least one of a multimedia function and a phone function, the at least two icons displayed based on the location information and audio path information related to the earphone,
      when the editing menu tray function is executed, displaying a list of functions displayable on the menu, and
      in response to receiving a user input to select one or more functions displayed on the list of functions, displaying the menu tray including the selected one or more functions.

* * * * *